(12) United States Patent
Tsumagari et al.

(10) Patent No.: US 6,217,297 B1
(45) Date of Patent: Apr. 17, 2001

(54) MOUNTING STRUCTURE OF ELECTRIC MOTOR-DRIVEN COMPRESSOR

(75) Inventors: Yuichi Tsumagari, Toyokawa; Masami Sanuki, Chiryu; Toshihiko Muraki; Tetsuya Takechi, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/151,007

(22) Filed: Sep. 10, 1998

(30) Foreign Application Priority Data

Sep. 25, 1997 (JP) .................................................. 9-260627
Jul. 9, 1998 (JP) .................................................. 10-194682

(51) Int. Cl.[7] .................................................. F04B 17/103
(52) U.S. Cl. ...................... 417/360; 417/423.5; 62/323.3
(58) Field of Search ................................. 417/423.5, 360; 62/323.3

(56) References Cited

U.S. PATENT DOCUMENTS 4,489,242 * 12/1984 Worst ................................... 307/10 R
5,441,122 * 8/1995 Yoshida ................................ 180/65.2

FOREIGN PATENT DOCUMENTS 5-185860   7/1993 (JP) .
9-53565    2/1997 (JP) .

* cited by examiner

Primary Examiner—Tony M. Argenbright
Assistant Examiner—Arnold Castro
(74) Attorney, Agent, or Firm—Pillsbury Winthrop LLP

(57) ABSTRACT

An electric motor-driven compressor is positioned closer to the center of gravity of an engine than a compression mechanism, and is mounted in such a manner that an axial direction of an electric motor is parallel to a crank shaft of the engine. Therefore, a vibration force produced by the engine and applied to the electric motor is reduced.

7 Claims, 6 Drawing Sheets

MOUNTING STRUCTURE OF ELECTRIC MOTOR-DRIVEN COMPRESSOR

CROSS REFERENCE TO RELATED APPLICATIONS

This application is based upon and claims priority from Japanese patent application Nos. Hei 9-260627, filed Sep. 25, 1997, and Hei 10-194682, filed Jul. 9, 1998, the entire contents of which are incorporated herein by reference.

BACKGROUND OF THE INVENTION

1. Field of the Invention:

The present invention relates to a mounting structure of an electric motor-driven compressor applied to a hybrid vehicle having an internal combustion engine (engine) and an electric motor for running the vehicle.

2. Description of Related Art:

In recent years, to reduce exhaust gas discharged from an engine, research and development of a hybrid vehicle have been vigorously conducted. In response to this, research and development of a refrigeration cycle for a vehicle, such as an air conditioner for a vehicle, suitable for the hybrid vehicle have been energetically conducted.

In a conventional type vehicle having only an engine as a power source, a driving force for a compressor for the refrigeration cycle thereof is supplied by the engine. However, the hybrid vehicle may have the following problem: since the engine stops in some running states, if the driving force is supplied only by the engine, the refrigeration cycle is also stopped when the compressor is stopped.

Therefore, it is desirable that the refrigeration cycle for the hybrid vehicle employs an electric motor-driven compressor having a built-in electric motor.

Regarding the hybrid vehicle, since the engine and the electric motor for running the vehicle are housed in an engine room, there is little vacant space in the engine room in comparison with a conventional vehicle. Therefore, it is desirable that the electric motor-driven compressor is mounted on the engine.

However, since the vibration of the vehicle caused by the engine acts the compressor for the vehicle, if the conventional compressor supplied with the driving force only by the engine is simply replaced with the electric motor-driven compressor, the vibration of the vehicle probably will damage to the electric motor-driven compressor (in particular, electric motor).

In this connection, there is a refrigeration cycle of a stay-at-home model such as a refrigerator, a home air conditioner or the like, for example, employing the electric motor-driven compressor in the refrigeration cycle. However, in these refrigeration cycles, a large vibration force like the vibration of the vehicle does not act on the electric motor-driven compressor, in contrast to the refrigeration cycle for a vehicle. Therefore, the mounting structure of the electric motor-driven compressor in the refrigeration cycle of a stay-at-home model cannot be applied to the electric motor-driven compressor for a vehicle.

SUMMARY OF THE INVENTION

The present invention is made in light of the foregoing problem, and it is an object of the present invention to provide a mounting structure of an electric motor-driven compressor for a vehicle taking into account the effect of the vibration of the vehicle.

According to a mounting structure of an electric motor-driven compressor of the present invention, the electric motor-driven compressor is mounted on an internal combustion engine in such a manner that an electric motor is positioned closer to the center of gravity of the internal combustion engine than a compression mechanism.

Since the electric motor is positioned closer to the center of gravity in which the vibration of the internal combustion engine is small, a vibration force acting on the electric motor becomes small. Therefore, this prevents the electric motor from being damaged.

According to another aspect of the present invention, the axial direction of an electric motor is parallel to a direction, which is parallel to a contact surface between the internal combustion engine and a fixing portion of an electric motor-driven compressor, and which has the smallest vibration force among directions parallel to the contact surface.

Accordingly, the vibration force applied to the electric motor becomes smaller, damage to insulation of the electric motor can be prevented. Therefore, the reliability (durability) of the electric motor-driven compressor is improved.

According to the another aspect of the present invention, a fixing portion of a motor housing is formed in a position deviated from a part corresponding to a stator core.

Therefore, the stator core is prevented from being greatly deformed in response to a deformation of a motor housing when a bolt is fastened.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS (First Embodiment)

Figure 1:
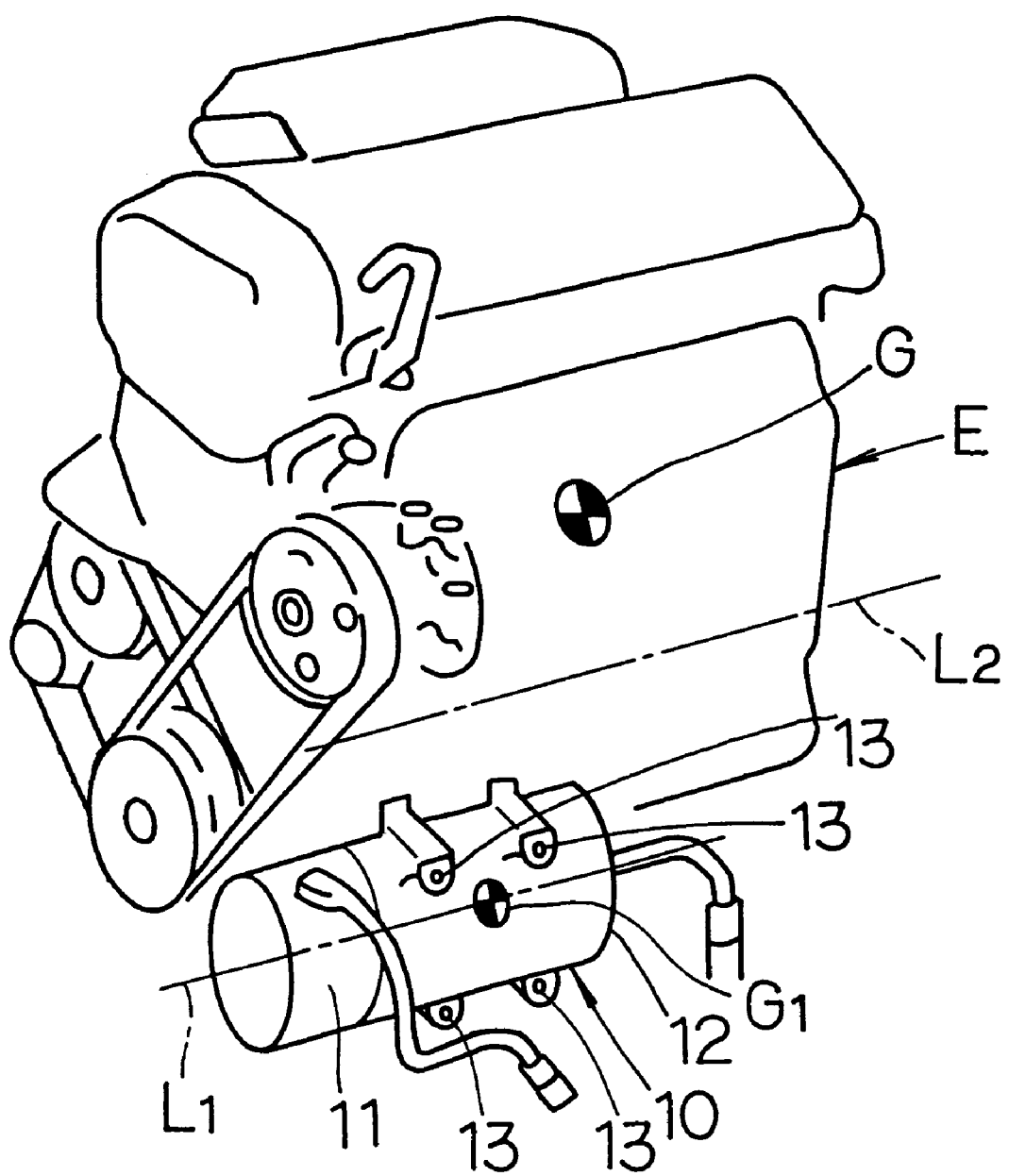
FIG. 1 is a perspective view illustrating a mounting structure of an electric motor-driven compressor according to embodiments of the present invention.
Figure 2:
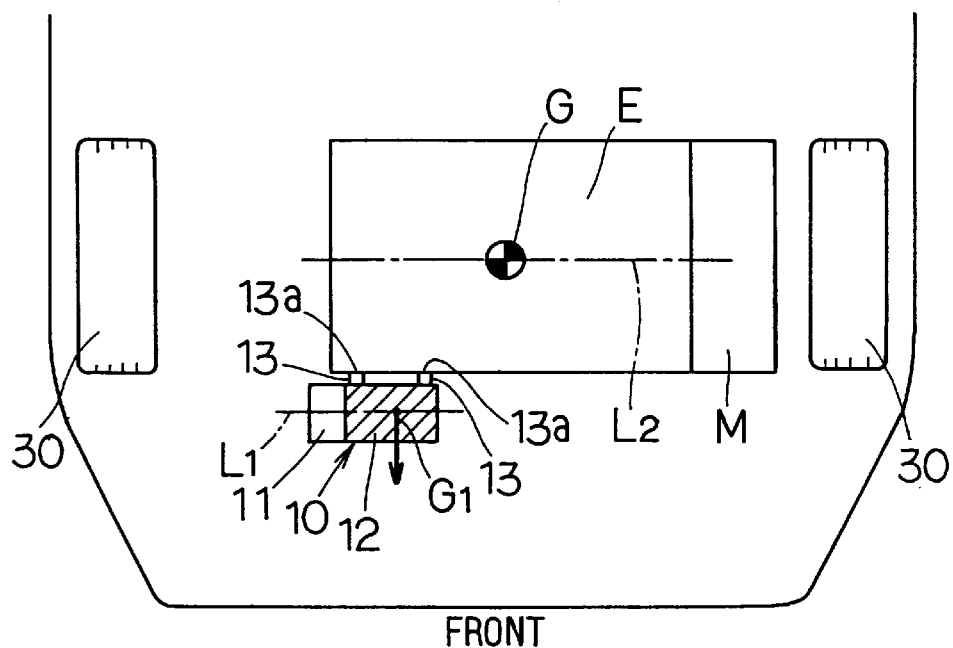
FIG. 2 is a schematic top plan view illustrating the mounting structure of the electric motor-driven compressor of the present invention when viewed from the top of a vehicle.
Figure 3:
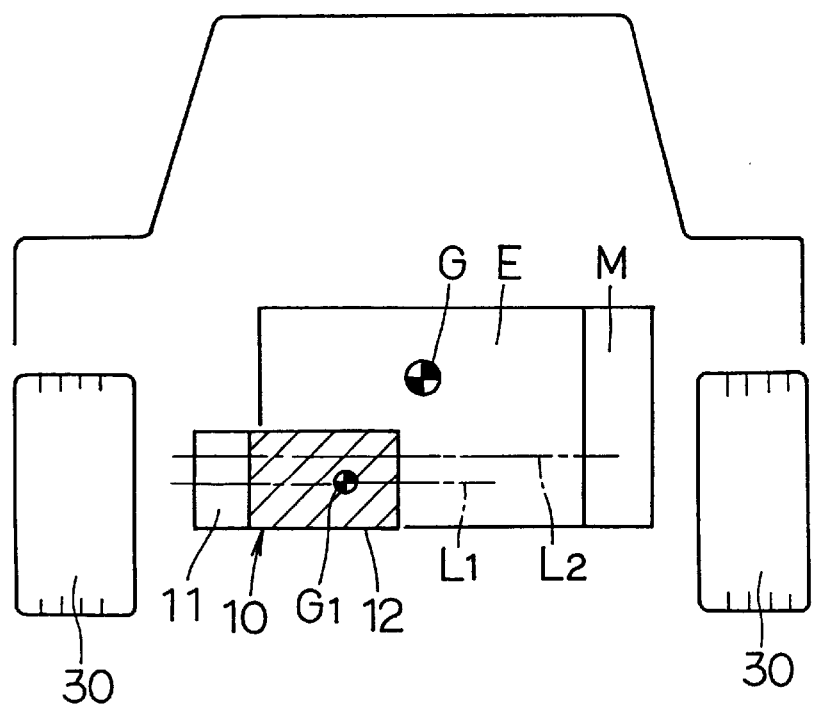
FIG. 3 is a schematic front view illustrating the mounting structure of the electric motor-driven compressor of the present invention when viewed from the front of the vehicle.

FIG. 1 is a perspective view illustrating a mounting structure of an electric motor-driven compressor according to a first embodiment applied to a hybrid vehicle having an internal combustion engine E and an electric motor M for running the vehicle (see FIGS. 2 and 3). In FIGS. 2 and 3, the reference numeral 30 represents a tire.

As shown in FIG. 1 to FIG. 3, an electric motor-driven compressor 10 for a vehicle refrigeration cycle comprises a scroll type compression mechanism 11 for sucking and compressing refrigerant and an electric motor 12 for driving the compression mechanism.

In the housing of the electric motor 12, as shown in FIG. 1, four bolt holes (fixing portions) 13 for fixing the electric motor-driven compressor 10 to a part of the engine E are formed on a housing of the electric motor 12, and the electric motor-driven compressor 10 is fixed to the engine by inserting the through bolts 132 (see FIG. 6B) into female thread holes (not shown) made in a crankcase of the engine E through the bolt holes 13.

The electric motor-driven compressor 10 is fixed to the engine E such that the electric motor 12 is positioned closer to the center of gravity G of the engine E than the compression mechanism 11 and that the axial direction $L_1$ of the electric motor 12 corresponds with the direction $L_2$ of the crank shaft of the engine E. Therefore, the axial direction $L_1$ of the electric motor 12 is parallel to the direction $L_2$ of the crank shaft of the engine E. The axial direction $L_1$ of the electric motor 12 is the axial direction of a rotor (armature) in the electric motor 12, and is parallel to a motor shaft of the electric motor 12.

It is generally known that the electric motor 12 includes a rotor (armature), a stator and the like. Therefore, the electric motor 12 is generally heavier than the compression mechanism 11. Therefore, usually, the center of gravity $G_1$ of the electric motor-driven compressor 10 locates closer to the electric motor 12 than the compression mechanism 11. On the other hand, the vibration of the engine E becomes smaller as the position is closer to the center of gravity G of the engine E.

Therefore, as shown in the first embodiment, if the electric motor 12 is positioned closer to the center of gravity G of the engine E than the compression mechanism 11, the vibration of the electric motor 12 is reduced, and a vibration force applied to the electric motor 12 is reduced. Thus, the electric motor 12 is prevented from being damaged by the vibration of the engine E.

The main reason for the damage of the electric motor 12 is that the winding of the rotor or the stator is shifted and causes the insulation failure. Therefore, the inventors hereof studied a relationship between the vibration direction and the damage of the electric motor 12, and discovered that when the vibration force is applied to the electric motor 12 in its axial direction, the winding was further shifted and cause the insulation failure than when the vibration force is applied to the electric motor 12 in its radial direction.

Figure 4:
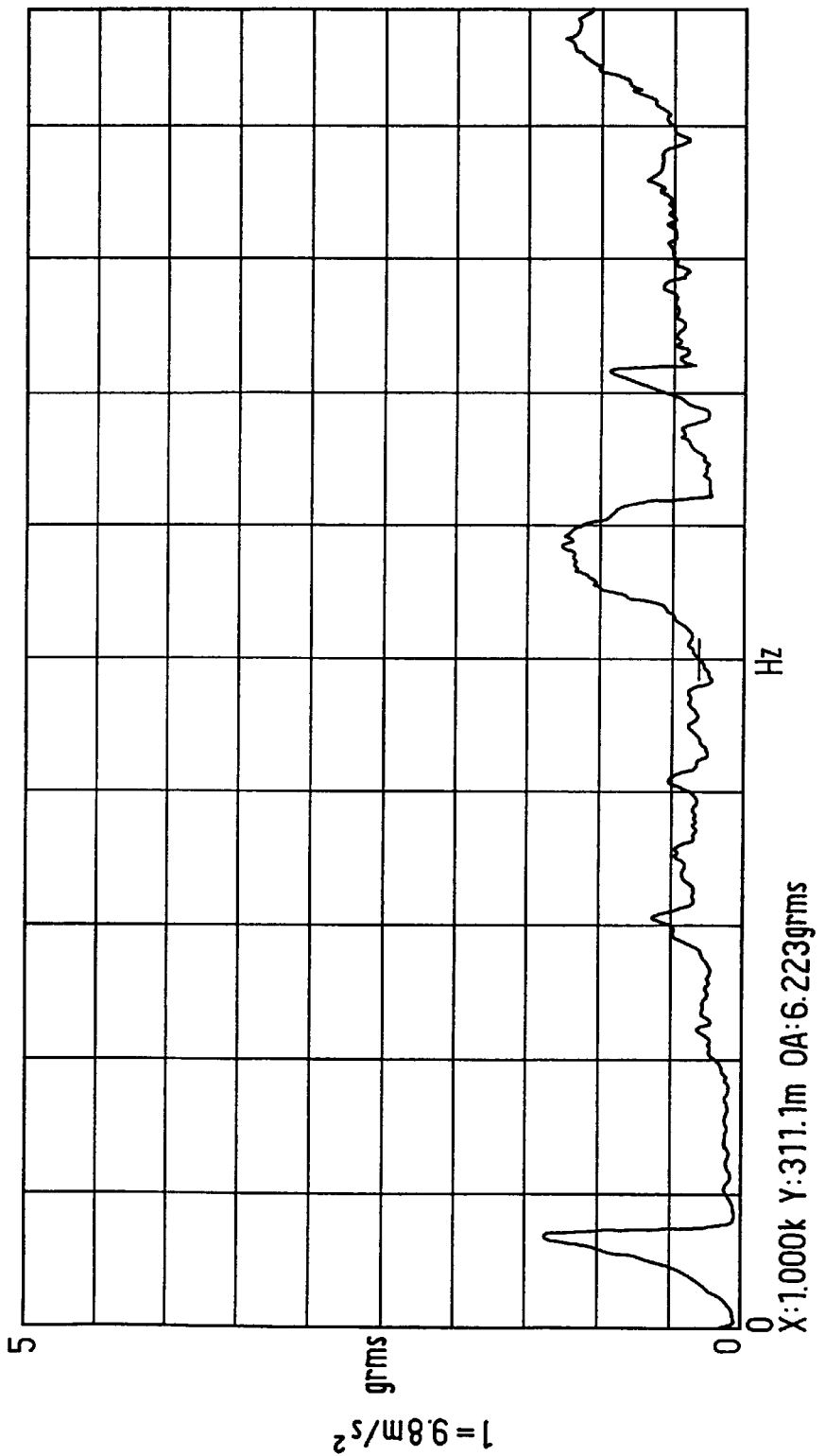
FIG. 4 is a graph showing measurement results of a vibration parallel to a crank shaft of an engine (lateral direction of the vehicle), measured at the compressor according to the first embodiment of the present invention.
Figure 5:
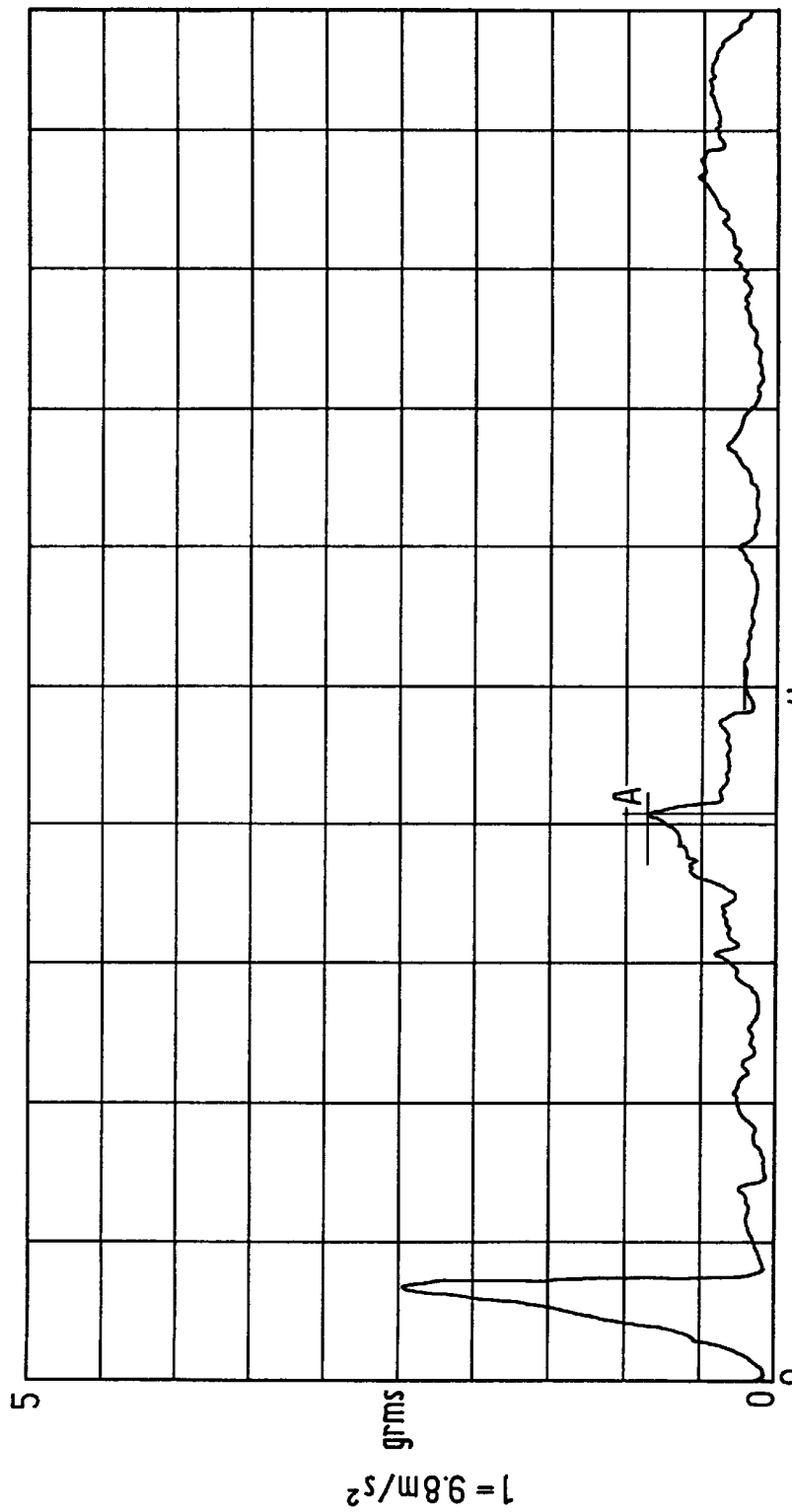
FIG. 5 is a graph showing measurement results of a vibration orthogonal to the crank shaft of the engine (vertical direction of the vehicle), measured at the compressor according to the first embodiment of the present invention.

As understood from FIGS. 4 and 5, the vibration force applied to the windings of the electric motor 12 is reduced, and the insulation failure is prevented since the direction $L_2$ of the crank shaft of the engine E, in which the vibration (vibration force) of the engine E is small, corresponds with the axial direction $L_1$ of the electric motor 12. Therefore, the reliability (durability) of the electric motor 12 (electric motor-driven compressor 10) is improved.

(Second Embodiment)

Figure 6A:
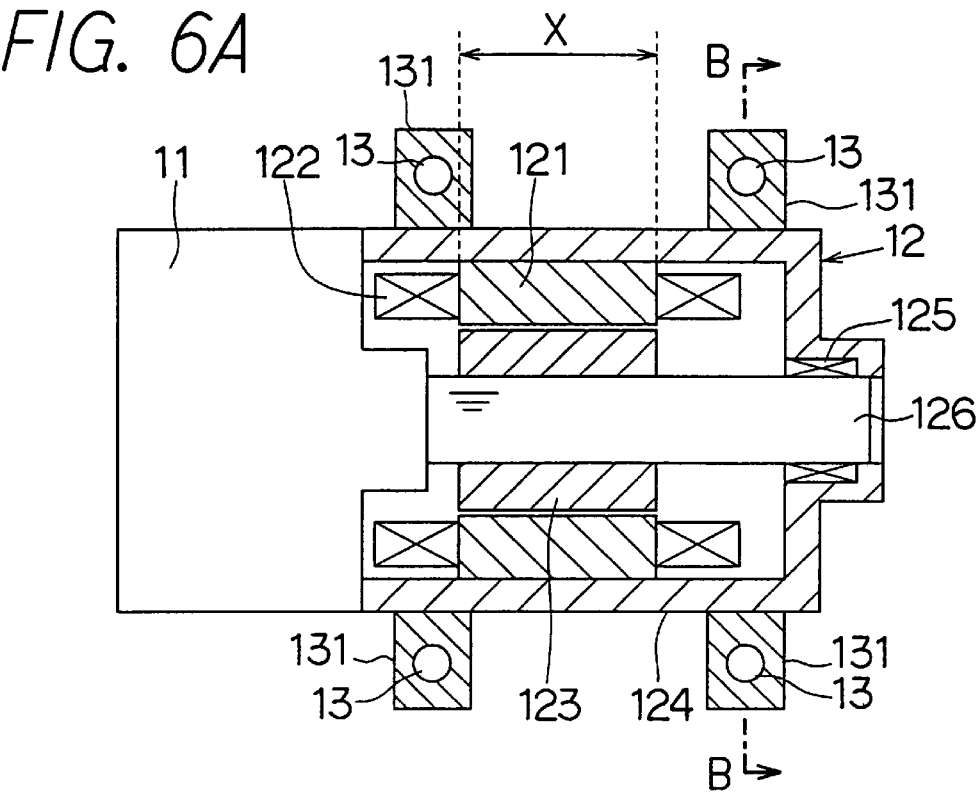
FIG. 6A is a partial cross-sectional view of an electric motor of the compressor according a second embodiment of the present invention.

As shown in FIG. 6A, the electric motor 12 includes an approximate cylindrical-shaped stator core 121, a coil 122 wound on the stator core 121, a magnet rotor 123 made of a permanent magnet that rotates in the stator core 121, and a motor housing 124 for housing the stator core 121, the coil 122 and the magnet rotor 123.

The stator core 121 is made by laminating thin magnetic materials such as silicon steel sheets.

The stator core 121 is pressed and fixed in the inner periphery of the motor housing 124 by a shrink fit (tight fit), and the magnet rotor 123 is rotatably supported in the motor housing 124 via a bearing 125 disposed on a shaft 126.

Furthermore, stays 131 having bolt holes 131 are integrally formed with the motor housing 124 such that each bolt hole 13 is positioned at an area deviated from an area corresponding to the stator core 121 of the motor housing 124 (the area designated by X in FIG. 6A).

Accordingly, the stator core 121 is prevented from being greatly deformed as the motor housing 124 is deformed when the bolts 132 are fastened. Therefore, defects such as peeling or breakage of the silicon steel sheets constituting the stator core 121 are prevented.

In the above described embodiments, the direction $L_2$ of the crank shaft corresponds with (parallel with) the axial direction $L_1$ of the electric motor 12. However, there may be a case in a vehicle of some type or size where it is difficult to mount the electric motor-driven compressor 10 on the engine E in a state in which the direction $L_2$ of the crank shaft corresponds with the axial direction $L_1$ of the electric motor 12.

In that case, the electric motor-driven compressor 10 may be fixed to the engine E such that the axial direction $L_1$ of the electric motor 12 is positioned parallel to a direction, which is parallel to a contact surface 13a between the engine E and bolt holes 13, and which has the smallest vibration force among directions parallel to the contact surface 13a.

The electric motor-driven compressor 10 according to the above described embodiments is driven only by the electric motor 12. However, the present invention can be also applied to a hybrid compressor, which can selectively switch between a situation where the compression mechanism 11 is driven by the electric motor 12 and a situation where the compression mechanism 11 is driven by a driving force supplied by the engine E, to be mounted on an engine of a hybrid vehicle or an engine of a vehicle that intends to reduce fuel consumption by stopping the engine when the vehicle is stopped.

Figure 6B:
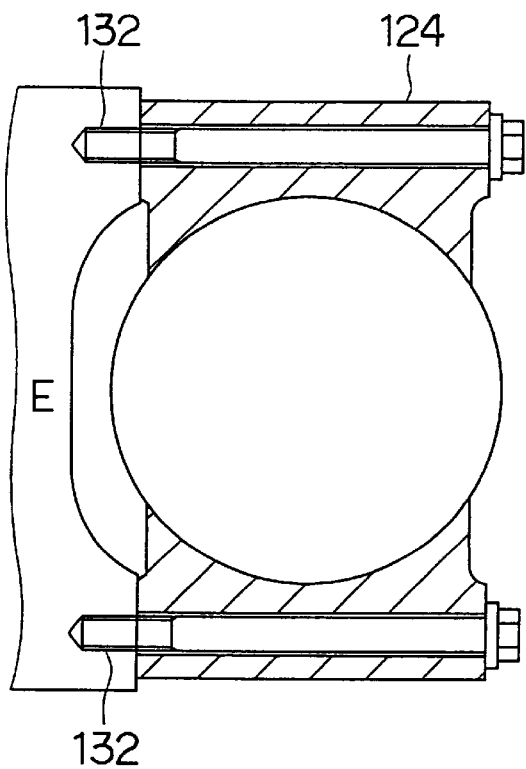
FIG. 6B is a cross-sectional view taken along a line B—B in FIG. 6A.
Figure 7:
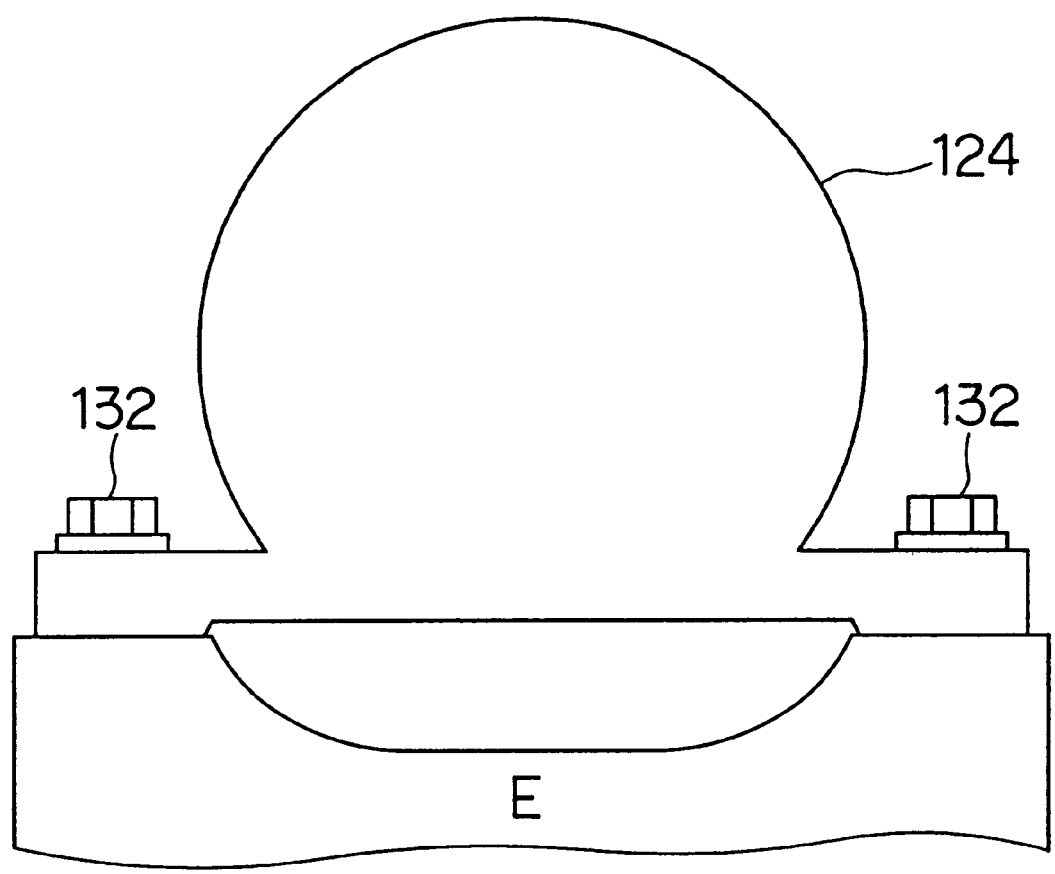
FIG. 7 is a schematic view showing a mounting state of an electric motor-driven compressor according to a modification of the second embodiment.

Furthermore, in the above described embodiments, the bolts 132 are provided such that they pass through the motor housing 124 in the radial direction of the magnet rotor 123 as shown in FIG. 6B. However, as shown in FIG. 7, the bolt holes 13 (stays 131) may be formed only in the engine block side of the motor housing 124.

In this case, since the fastening force is not applied to the motor housing 124, even if the bolt holes 13 are positioned at the area corresponding to the stator core 121, the stator core 121 is hardly deformed.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A mounting structure of an electric motor-driven compressor applied to a hybrid vehicle having an internal combustion engine and a vehicle electric motor for running the vehicle, said mounting structure comprising:

a compression mechanism for compressing fluid; and a compressor electric motor integrated with said compression mechanism for driving said compression mechanism, said compressor electric motor being heavier than said compression mechanism, wherein;

said electric motor-driven compressor mounted on the internal combustion engine in such a manner that said compressor electric motor is positioned closer to a center of gravity of the internal combustion engine than said compression mechanism.

2. A mounting structure of an electric motor-driven compressor according to claim 1, wherein;

said electric motor-driven compressor includes a fixing portion for fixing said electric motor-driven compressor to the internal combustion engine; and an axial direction of said compressor electric motor corresponds with a direction, which is parallel to a contact surface between the internal combustion engine and said fixing portion, and which has the smallest vibration force generated by the internal combustion engine among directions parallel to said contact surface.

3. A mounting structure of an electric motor-driven compressor according to claim 1, wherein;

an axial direction of said compressor electric motor is parallel to a direction of a crank shaft of the internal combustion engine.

4. A mounting structure of an electric motor-driven compressor according to claim 2, wherein;

said compressor electric motor includes an approximately cylindrical stator core, a rotor for rotating in said stator core, and a motor housing for housing said stator core and said rotor;

said fixing portion includes a bolt hole in which a bolt is inserted to fix said motor housing to the internal combustion engine; and said fixing portion is formed on said motor housing at a position deviated from a part corresponding to said stator core.

5. A method for mounting an electric motor-driven compressor, which has a compression mechanism and an electric motor being heavier than said compression mechanism for driving said compression mechanism, on an internal combustion engine, comprising a step of mounting said electric motor-driven compressor on the internal combustion engine in such a manner that said electric motor is positioned closer to a center of gravity of the internal combustion engine than said compression mechanism.

6. A method for mounting an electric motor-driven compressor according to claim 5, further comprising a step of corresponding an axial direction of said electric motor parallel to a crank shaft of the internal combustion engine.

7. A method for mounting an electric motor-driven compressor according to claim 6, further comprising a step of fixing said compressor to the engine by bolting at a fixing portion of a motor housing, which embraces a stator core, of said electric motor in such a manner that said fixing portion is located outside of an area corresponding to said stator core.

* * * * *